Patented May 21, 1940

2,201,871

UNITED STATES PATENT OFFICE 2,201,871

PLASTIC COMPOSITION

Raphael Rosen, Elizabeth, N. J., assignor to Standard Oil Development Company, a corporation of Delaware No Drawing. Application October 27, 1936, Serial No. 107,823

5 Claims. (Cl. 260—42)

This invention relates to improved plastic compositions and methods of preparing same.

Broadly the invention comprises compounding with plastics of the olefine dihalide-aromatic hydrocarbon type, a high molecular weight, plastic or elastic, aliphatic or substantially saturated linear hydrocarbon such as an iso-olefine polymer, which serves to protect the former against attack by acids, alkalies, and various other chemical agents, as well as against the harmful effects of weathering, including water, oxidation by air, etc., without injuring their valuable properties.

The invention is particularly applicable to certain types of plastic products; for example, a high molecular weight polymer of isobutylene is preferably used as compounding and protective agent, and the aromatic plastic product is preferably produced by reacting ethylene dichloride in the presence of a small amount of aluminum chloride with an aromatic compound having the general formula $RC_6H_4R'$, wherein R and R' each represent hydrogen or a saturated aliphatic hydrocarbon radical containing more than 1 carbon atom.

In preparing the ethylene-dihalide-aromatic hydrocarbon plastic, preferably 1 to 3 molar proportions of ethylene dihalide are used for each 1 molar proportion of the aromatic compound. This aromatic compound may be either benzene or various mono-alkyl-substituted benzenes, e. g. ethyl benzene, propyl benzene, isopropyl benzene, butyl benzene, or a dialkyl-substituted benzene, e. g. diethyl benzene, ethyl isopropyl benzene, diisopropyl benzene, etc. Ethylene dichloride is preferred as the halide to be used because of its lower cost than the other halides, e. g. ethylene bromide. Other alkylene dihalides may be used, e. g. propylene, butylene and the like. The term "olefine dihalide" as used herein, is intended to mean alkylene dihalide broadly as well as other compounds having such a chemical structure that they react with aromatic compounds of the type described, like ethylene dichloride, for instance, B, B' dichlorethyl ether.

In carrying out the preparation of this plastic, the aromatic compound is treated with the ethylene dihalide in the presence of a small amount of aluminum chloride and the reaction, which is accompanied by the evolution of hydrogen chloride and an increase in the viscosity of the reaction mass, is allowed to proceed until a jelly-like mass is formed and is then preferably stopped by washing (with agitation or breaking up of the gel structure) the reaction mass with water or with a dilute aqueous solution of an acid, such as hydrochloric acid, or an alkali, such as sodium hydroxide, and finally washing with water. To facilitate the washing treatment, a small amount of an organic solvent, such as butyl acetate, may be used and also, if desired, any unreacted aromatic hydrocarbon or ethylene dihalide may be removed by steam distillation before or during the washing operation.

In carrying out this phase of the process, instead of aluminum chloride, other metal halides belonging to the Friedel-Craft type of condensing agent may be used; for example, ferric chloride may be used although it reacts more slowly. The amount of condensing agent should be between about 5 and 20%, preferably between about 7 and 10% of the weight of the aromatic hydrocarbon used. The temperature must be adjusted according to the specific catalyst used. Ordinarily with aluminum chloride and using 1 part benzene and 3 parts ethylene chloride as reactants, the temperature should best be held at about 40–50° C., until it begins to slow down and may be finally raised to 60–70° C. to complete the reaction. The entire reaction time may be about 25 to 30 hours.

The resulting product is a spongy mass of elastic particles, which may be separated from the water and dried. Drying may be effected by heating at an elevated temperature, for example at 70° to 100° C., under vacuum if desired, thereby removing residual water, volatile hydrocarbon and ethylene dihalide, or the product may first be partially dried by squeezing, as by passing the material repeatedly through the rolls of a rubber mill. When so milled the particles coalesce to form a smooth continuous sheet. When the products are heated in the presence of water as in the washing and steaming operations they become lighter in color; when they are worked on a cold mill the color remains unchanged. When the products are heated substantially in the absence of water as in hot air, or when worked on a hot mill at temperatures below about 200° C., the products become dark in color, but are otherwise unchanged by the heat.

The resulting products are highly resistant to the solvent action of many common organic solvents such as benzene, naphtha, etc.

On the other hand, the aliphatic hydrocarbon is preferably a substantially saturated linear type iso-olefine polymer, having a molecular weight ranging from about 2000 or 3000 up to 10,000 or 15,000 for a plastic and somewhat sticky polymer or ranging from about 50,000 to 300,000 or more for an elastic and only very slightly sticky polymer substantially free from tendency to flow at ordinary room temperature. These polymers are prepared by the polymerization of an iso-olefine, preferably, isobutylene, in the presence of a volatile inorganic halide, particularly boron fluoride, at temperatures below about −10° C., which may be as low as −50° C. or −100° C. The higher molecular weight products are obtained by using substantially pure isobutylene and a very low temperature and carrying out the polymerization in the presence of a suitable solvent, such as purified ethylene or other low-boiling liquefied gaseous hydrocarbons, e. g. propane or a mixture of methane, ethane, etc. It is particularly important in preparing the extremely high molecular weight polymer that the starting materials should be free from sulphur compounds and other substances which act as poisons in the polymerization of the isobutylene.

After the polymerization has been completed, the temperature is allowed to rise to room temperature and the product is then washed with water or an aqueous solution of caustic soda or other suitable agent in order to free it of any catalyst.

If desired, the polymerized product may be separated into fractions having different molecular weights either by extraction or selective precipitation, using solvents such as ethane, propane, naphtha, benzol, acetonebenzol, etc., at the proper temperature to make the desired separation. In this way, the polymers having any desired average molecular weight, such as about 100,000, may be separated from those having substantially lower and higher molecular weight.

In carrying out the polymerization, although it is preferred to use boron fluoride as the catalyst, one may also use phosphorous tri-fluoride, phosphorous penta-fluoride, etc. or other solid inorganic halides, e. g. aluminum chloride, but these do not give as good results as the boron fluoride.

Hydrogenated rubber may be used instead of polymerized isobutylene.

It should be understood that no claim is here made to either the aromatic compound-alkylene dihalide reaction products or to the high molecular weight isobutylene polymer per se, but that the essence of the present invention is a plastic composition comprising both of those two products.

The proportions in which these two products are compounded may vary over a fairly broad range and depend upon several factors, particularly the nature of the raw materials used in preparing the aromatic compound-ethylene dichloride reaction product, the average molecular weight of the isobutylene polymer and the physical properties of hardness, elasticity, plasticity, etc., and chemical properties desired in the finished product. Ordinarily, about .05 to 20 parts of the isobutylene polymer will be used to 1 part of the aromatic compound-ethylene dihalide reaction product and generally the proportions will be within the somewhat narrower limits of about 0.1 to 10 parts of the isobutylene polymer to 1 part of the other product.

The compositions may be prepared according to the present invention by either mechanically mixing the plastic product with the high molecular weight polymer of isobutylene, e. g. by milling, kneading, etc., at room or slightly elevated temperature, or by carrying out the alkylene dihalide-aromatic hydrocarbon condensation in the presence of the desired proportion of the plastic aliphatic hydrocarbon, or by any other suitable means.

For the sake of illustration, the following specific examples are given:

*Example 1*

10 parts by weight of an aromatic compound-ethylene dihalide reaction product were compounded on a rubber mill with 90 parts by weight of an isobutylene polymer having an average molecular weight of about 100,000 until the composition was substantially homogeneous. The product was almost black. It was rubber-like and elastic although having a tendency to cold flow. It showed a high degree of resistance to attack by chemicals, such as nitric acid, caustic soda, and the like.

The particular sample of aromatic compound-ethylene dihalide reaction product used in this example was one which was obtained on the market and had the following physical and chemical properties:

| | |
|---|---|
| Specific gravity | 1.04 |
| Ash | 1.2 |
| Color | Black |
| Odor | Slight |
| Hardening temperature | 0° C. |
| Tensile strength | 350 lb./sq. in. |
| Elongation 20° | 300% |

*Example 2*

50 parts by weight of the same aromatic compound—ethylene dihalide reaction product—were similarly compounded on a rubber mill with about 50 parts by weight of an isobutylene polymer having an average molecular weight of about 190,000.

The following data show properties of the mixed composition in comparison with those of the two separate ingredients.

| Composition | Aromatic plastic | Isobutylene polymer | 1:1 mixture of aromatic plastic and isobutylene polymer |
|---|---|---|---|
| Elongation 20° C | 300% | 900% | 600%. |
| Hardening point | 0° C | Below −200° C. | Below −50° C. |
| Properties at −30° C | Hard and brittle. | Pliable | Pliable. |
| Solvent resistance: | | | |
| Benzene | Good | Soluble | Fair. |
| Varnolene | do | do | Do. |

From these data it is apparent that the flexibility of the aromatic plastic (normally hard and brittle at −30° C.), is greatly increased by compounding the isobutylene polymer therewith, whereas the valuable solvent-resisting properties of the aromatic plastic are only moderately affected. Such a mixed composition is much more suitable for certain purposes than either of the individual constituents.

As one illustration of the advantages of the present invention, it might be mentioned that the prospective use of such an aromatic plastic in cable sheathing, etc., is dependent upon its having flexibility over a wide range of temperatures. Unfortunately, the ordinary commercial grades of this aromatic plastic become quite brittle at the low temperatures very frequently experienced in temperate regions. This difficulty could be overcome by stopping the polymerization at an earlier stage, but by so doing a product would be made which is too soft for use at higher temperatures; i. e., it would be soft and plastic instead of fairly firm and tough, and also it would have a greatly increased solubility in solvents. However, when high molecular weight plastic or elastic substantially saturated linear type hydrocarbons are homogeneously mixed with such aromatic plastics, the mixed product has substantially all of the advantages of both of the individual ingredients without their disadvantages. They have satisfactory elongation, low hardening point, they are pliable, (this is particularly favorable at low temperatures), and have fairly good resistance to attack by solvents and are quite resistant to attack by many of the common chemicals.

It is not intended that this invention be limited to any of the specific examples given, nor to the mechanism as to the operation of the invention, but only by the appended claims in which it is intended to claim all novelty inherent in the invention as broadly as the prior art permits.

I claim:

1. A homogeneous plastic composition comprising in combination one part by weight of a condensation product of olefine dihalide with an aromatic hydrocarbon having the general formula $RC_6H_4R'$, where R and R' represent substituents selected from the group consisting of hydrogen and a saturated aliphatic hydrocarbon radical containing more than one carbon atom with .05 to 20 parts by weight of a high molecular weight polyisobutylene hydrocarbon having a molecular weight above about 2000, the mixture being characterized by plasticity at temperatures as low as $-30°$ C.

2. Composition according to claim 1 containing about 0.1 to 10 parts by weight of the high molecular weight polyisobutylene hydrocarbon for each part of aromatic hydrocarbon-olefine dihalide condensation product.

3. Process of preparing homogeneous plastic compositions which comprises compounding .05 to 20 parts by weight of high molecular weight, normally substantially solid plastic or elastic polyisobutylene hydrocarbon having a molecular weight above about 2000 with one part by weight of a condensation product of olefine dihalide with an aromatic hydrocarbon having the general formula $RC_6H_4R'$, where R and R' represent substituents selected from the group consisting of hydrogen and a saturated aliphatic hydrocarbon radical containing more than 1 carbon atom the said composition being characterized by plasticity at temperatures as low as approximately $-30°$ C.

4. A homogeneous plastic composition consisting essentially of about 50 to 10% by weight of a condensation product of ethylene dichloride with an aromatic hydrocarbon having the general formula $RC_6H_4R'$ where R and R' represent substituents selected from the group consisting of hydrogen and a saturated aliphatic hydrocarbon radical containing more than one carbon atom, together with 90 to 50% of an isobutylene polymer having an average molecular weight above about 2000 the said composition being characterized by plasticity at temperatures as low as approximately $-30°$ C.

5. Process of preparing homogeneous plastic compositions which comprises reacting an olefin di-halide with an aromatic hydrocarbon having the general formula $RC_6H_4R'$ where R and R' represent substituents selected from the group consisting of hydrogen and a saturated aliphatic hydrocarbon radical containing more than one carbon atom, in the presence of a substantial proportion of an isobutylene polymer having an average molecular weight above about 2000 the amount of isobutylene polymer used being such that the finished homogeneous composition contains approximately 5% to 95% of isobutylene polymer and is characterized by a plasticity at temperatures as low as approximately $-30°$ C.

RAPHAEL ROSEN.